United States Patent [19]

Wilkinson

[11] Patent Number: 4,664,740

[45] Date of Patent: May 12, 1987

[54] TAX STAMPING MACHINE

[75] Inventor: Donald R. Wilkinson, Clemmons, N.C.

[73] Assignee: R. J. Reynolds Tobacco Company, Winston-Salem, N.C.

[21] Appl. No.: 741,790

[22] Filed: Jun. 6, 1985

[51] Int. Cl.[4] .......................... B44C 1/00; B65C 9/02; B65G 47/24

[52] U.S. Cl. .................................... 156/540; 156/541; 156/DIG. 25; 198/415; 101/21

[58] Field of Search ............... 156/277, 230, 238, 359, 156/361, 360, 541, 540, DIG. 2, DIG. 25, DIG. 36, 362; 198/415; 101/21

[56] References Cited

U.S. PATENT DOCUMENTS

| | | | |
|---|---|---|---|
| 907,116 | 12/1908 | Baker | 198/416 |
| 1,766,662 | 6/1930 | Luedtke et al. | 101/21 |
| 1,809,219 | 6/1931 | Ritscher | 198/416 |
| 1,916,575 | 7/1933 | Knitter | 101/21 |
| 4,101,362 | 7/1978 | Baker et al. | 156/238 |
| 4,263,766 | 4/1981 | Baker et al. | 156/359 |
| 4,462,851 | 7/1984 | Colgate, Jr. | 156/277 |

*Primary Examiner*—David Simmons
*Assistant Examiner*—Louis Falasco
*Attorney, Agent, or Firm*—Manford R. Haxton

[57] ABSTRACT

A tax stamping machine for applying heat activated tax decals to the bottom of packs of cigarettes in cartons utilizes an adjustable carton guide channel having an offset section and a heated stamp bar having a plurality of selectable patterns of heated platens. The cigarette carton guide channel is adjustable in both width and depth so that various sizes of cigarette packs in cartons can be handled. A carton stop bar and reset latch assembly are used to halt the travel of hand fed cartons along the guide channel while tax stamps or decals are applied to the packs within the cartons. Webs of stamps or decals, having configurations corresponding to the various patterns of heated platens on a vertically reciprocable stamp bar, are placed in the stamp carriage assembly, and are used in conjunction with the properly patterned platen of the stamp bar to effect placement of the heat activated decals on the bottom surface of the cigarette packs in the various non-standard carton configurations with which the tax stamping machine is intended to operate.

20 Claims, 12 Drawing Figures

TAX STAMPING MACHINE

FIELD OF THE INVENTION

The present invention is directed generally to a machine for applying tax stamps to cigarette packs in cartons. More particularly, the present invention is directed to a tax stamping machine adaptable to varying carton sizes and pack configurations. Most specifically, the present invention is directed to a low volume, hand fed tax stamping machine. Cartons of cigarettes are hand fed to the stamp applying assembly along an adjustable guide chute or channel. A heated stamp transfer applicator cooperates with a sheet or web of stamps and applies the stamp to each cigarette pack in the carton. The number of decals or stamps contained in each row of stamps carried on the rolled web and the number of heated surfaces or platens on the heated applicator is selected to correspond with the cigarette pack configuration in the carton. Non-standard pack sizes and carton configurations are readily tax stamped by the tax stamping machine in accordance with the present invention.

DESCRIPTION OF THE PRIOR ART

Many jurisdictions such as state and county governments raise substantial revenues through taxes levied on the sale of cigarettes. To insure that the required taxes have been paid, the appropriate governmental agency sells tax stamps to the wholesale distributor or jobber who must apply one or more of these tax stamps to each pack of cigarettes before it can be sold in a retail outlet. These stamps or transfers are typically mounted or attached to long sheets or webs which are formed into rolls and which are sold by the taxing authority to the wholesale distributor or jobber. Because of the wide variety of taxing agencies, the various tax rates, and the inherent distribution problems which would arise, the manufacturer of the cigarettes is not able to apply these local government revenue raising tax stamps to the packages of cigarettes. As indicated above, this task is left to the wholesale distributor whose primary concern is being able to apply the tax stamps or transfers in the most expeditious, least time consuming manner possible.

The standard cigarette carton configuration is one in which ten packs of cigarettes are arranged in a two pack wide by five pack long configuration, usually referred to as a 2×5 pack arrangement. Rolls of tax stamps or decals have typically been supplied by local governments to the distributor or wholesaler in a standard configuration that carries spaced rows, each of which has 15 stamps. Various tax stamp applying machines are known in the art for use in applying selected ones of these stamps to the 2×5 pack carton configuration. Exemplary of these are U.S. Pat. No. 4,101,362 to Baker et al; U.S. Pat. No. 4,184,305 to Baker et al; and U.S. Pat. No. 4,263,766 also to Baker et al. These three patents are assigned to the assignee of the present application and their disclosures are incorporated herein by reference. Various other tax stamp and decal applying machines are also known in the art. These are structured to operate with the standard 15 tax stamp wide rolls of stamps and are apt to be somewhat complex assemblies intended to operate at high rates of speed in a generally automatic fashion. They are not particularly suited to low speed, low volume operation and cannot handle cartons having an other than 2×5 pack configuration.

Several recently introduced brands of cigarettes have started a trend away from conventional sizes and pack configurations. For instance, one brand of cigarettes now on the market is thinner or smaller in diameter than prior cigarettes and is longer in length. Due to their smaller diameters, these cigarettes form a smaller pack which, in an effort to maintain a generally standard carton size, requires a 1×10 pack array instead of the conventional 2×5 array. Another brand of cigarettes is sold in a 25 cigarette pack instead of the usual 20 cigarette pack. To again approximate standard carton size, these cigarettes are sold in a 1×9 carton array. In either the 1×10 or the 1×9 array, these cartons of cigarettes are not usable with the previously available tax stamp applying machines.

The wholesaler distributor or jobber, has been forced to hand stamp these non-standard carton configurations. Obviously, this is a slow, tedious, expensive, and inefficient way of applying the required tax stamps or decals. Although the wholesale distributor desires to carry a complete product line, he may decide that the expenditure in time, effort, and money required to hand stamp these other than standard pack configurations is not justified in view of the market share held by the cigarettes. Thus the wholesaler or distributor decides not to sell the particular brand of cigarettes. Even though the consumer may like this particular brand of cigarettes, he will make another selection if he cannot readily locate the desired brand. This leads to reduced sales and decreased revenues for the manufacturer.

It will readily be seen that a need exists for a tax stamp or decal applying machine which is usable with other than standard 2×5 cigarette pack cartons. Such a tax stamping machine must be dependable, easy to operate and maintain, and must be able to adapt to various cigarette pack configurations and to carton sizes that are not standard. While this machine need not operate at as high a rate of speed as do machines usable with standard 2×5 carton, it must nonetheless be operable at a rate of speed and in a manner which makes it economically feasable for the wholesale distributor or jobber to apply tax stamps or decals to other than standard carton sizes and configurations.

SUMMARY OF THE INVENTION

It is an object of the present invention to provide a tax stamping machine.

A further object of the present invention is to provide a machine for applying tax stamps to cigarette packs in cartons.

Another object of the present invention is to provide a tax stamping machine which transfers tax stamps or decals from a rolled sheet or web to an array of cigarette packages.

Yet a further object of the present invention is to provide a tax stamping machine usable with non-standard cigarette packages and carton configurations.

Still another object of the present invention is to provide a tax stamping machine which is adjustable to different non-standard configurations.

Yet still a further object of the present invention is to provide a tax stamping machine in which cigarette cartons can be hand fed in a non-spaced array.

Even still another object of the present invention is to provide a tax stamping machine having automatic carton registering means.

As will be discussed in greater detail in the description of the preferred embodiment, as set forth hereinafter, the tax stamping machine in accordance with the present invention is intended for use in applying tax stamps or decals to non-standard cigarette pack and carton configurations. It is a low volume, hand fed machine which will apply tax stamps or decals to, for example, 1×10 or 1×9 carton configurations in a manner such that it is ideal for use by wholesale distributors or jobbers. Cartons of cigarettes are hand fed to an infeed end of an elongated carton guide chute or channel. As cartons are pushed along the channel, their glue seals are broken by hand, and a carton opening plow folds back the carton flaps to expose the bottom surfaces of the packs of cigarettes. The cartons advance to a position under a stamp carriage assembly where the leading edge of the carton is stopped by a carton stop. A heated bar, which carries a number of heated platens, then lowers and transfers heat release decals from a sheet of decals to the bottom of the various cigarette packs. As the heated bar is raised up away from the now stamped packs, the carton stop is retracted and is latched in its retracted position. The now stamped carton is pushed down the chute or channel by the next carton and as it advances, its leading edge contacts a reset latch which releases the carton stop. The released carton stop rides along the side of the advancing, stamped carton until the carton moves over or "fish tails" in the angled cigarette carton guide channel. As the trailing end of the carton swings away in the offset channel, the carton stop again extends fully into the guide channel to stop the next advancing carton and the cycle is repeated. The previously stamped carton's flaps are glued and are reclosed and sealed.

The sheet of tax stamps or decals and the pattern of heated platens or pads on the stamp applying bar are coordinated to each other and will vary with different carton configurations. While the width of the stamp carrying sheet is the same as a standard sheet used for 2×5 configuration cartons, the stamps will be placed on the sheet either in a 9 or 10 stamps to a row orientation, assuming a 1×9 or 1×10 packs in a carton array. The stamp bar in accordance with the present invention has at least two usable surfaces with each surface having a different platen array such as 9 or 10 heated platens, again assuming a 1×9 or 1×10 configuration. When the distributor or jobber needs to apply tax stamps or decals to non-standard cartons, he places the properly configured roll of stamps in the stamp carriage and adjusts the stamp bar to the corresponding position. The cartons can then be fed into the machine by hand at a rate of up to 50 cartons a minute. Each carton is opened, stamped, and closed by the machine and the stamp is applied to each pack in the carton at the proper location. Changing from one configuration of carton to another is accomplished quite rapidly by switching stamp rolls and by turning the stamp bar to place the proper face in alignment with the new stamp roll.

The tax stamping machine in accordance with the present invention further includes means for adjusting the width and depth of the carton guide channel or chute. The cartons are supported in the channel on a platform which can be raised or lowered with respect to the channel side walls. This allows the tax stamping machine to a operate with cartons of cigarettes of various lengths. The guide channel side walls are also adjustable so that they can be adjusted to properly engage cartons of various widths. These adjustment means again aid in allowing the tax stamping machine in accordance with the present invention to be usable with a variety of non-standard pack and carton configurations.

The tax stamping machine in accordance with the present invention provides the distributor with a means for expeditiously tax stamping non-standard cigarette packs and cartons. The machine is adaptable to various carton sizes and pack configurations, can handle up to 50 cartons a minute, allows hand feeding of the cartons in an end to end manner and operates to properly apply the tax stamps. Since the tax stamping machine in accordance with the present invention eliminates the previously required hand stamping of non-standard configurations, wholesalers are not reluctant to handle these brands whose sales are accordingly positively effected.

BRIEF DESCRIPTION OF THE DRAWINGS

While the novel features of the tax stamping machine in accordance with the present invention are set forth with particularity in the appended claims, a full and complete understanding of the invention may be had by referring to the detailed description of the preferred embodiment as is set forth hereinafter and as may be seen in the accompany drawings in which:

DESCRIPTION OF THE PREFERRED EMBODIMENT

Figure 1:
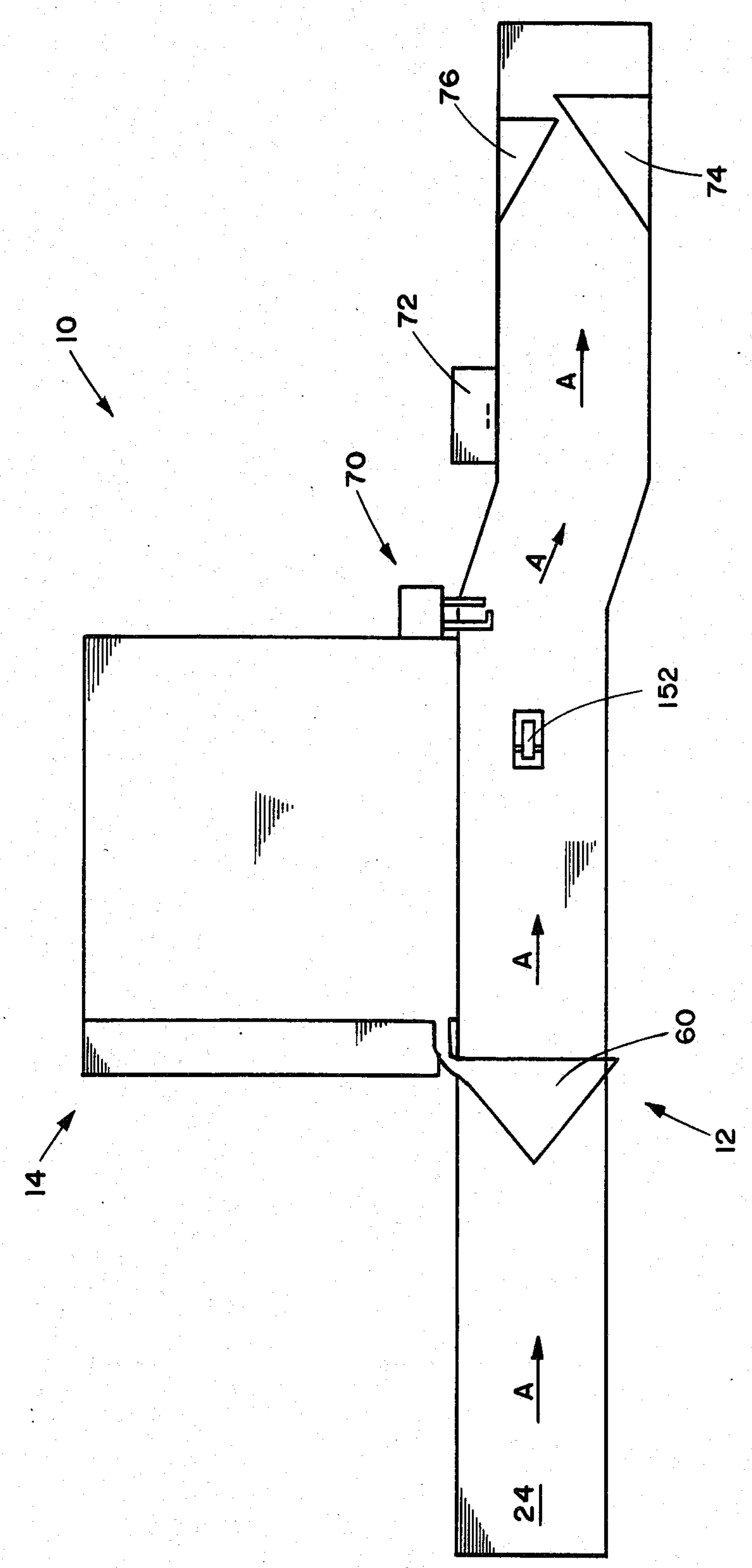
FIG. 1 is a top plan view of a schematic positional arrangement of the tax stamping machine in accordance with the present invention.

Referring initially to FIG. 1, there may be seen generally at 10 a tax stamping machine in accordance with the present invention. In FIG. 1 tax stamping machine 10 is shown in schematic form with this view being intended primarily to show the orientation of the several portions of the machine. Tax stamping machine 10 is comprised of two cooperating portions, a cigarette carton guide assembly generally at 12, and a stamp carriage assembly generally at 14. As their names imply, the carton guide assembly 12 supports and guides the cigarette cartons while the stamp carriage assembly 14 applies the tax stamps or decals to the cigarette packs in the cartons as the cartons pass along in the guide assembly 12 generally beside and beneath the stamp carriage assembly 14. While the tax stamping machine in accordance with the present invention is equally applicable to ink type stamping operations, its principal application is to heat activated decal-type transfer stamps and it will be described with respect thereto.

Figure 2:
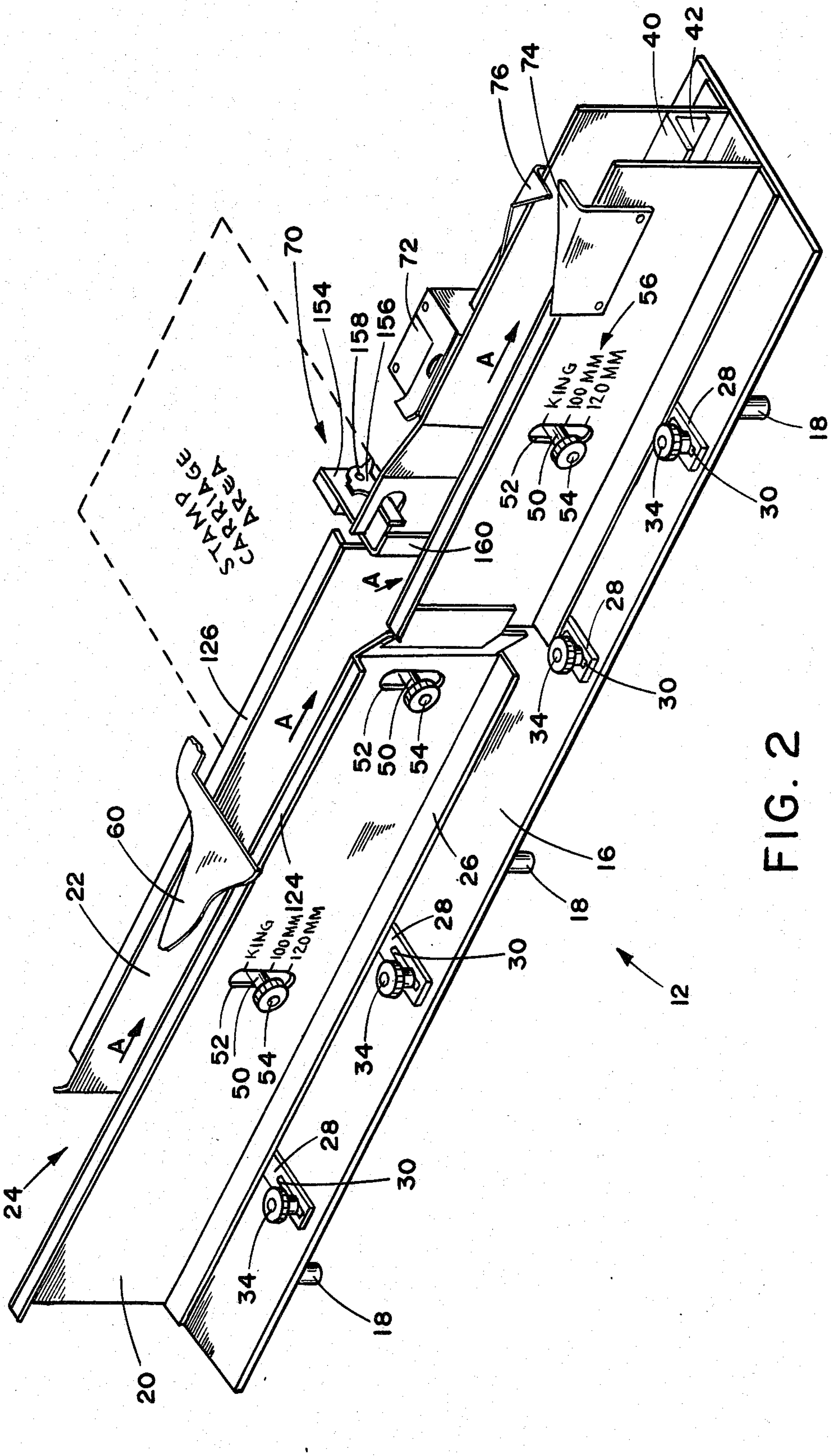
FIG. 2 is a perspective view of the carton guide channel and bed assembly of the present invention.
Figure 3:
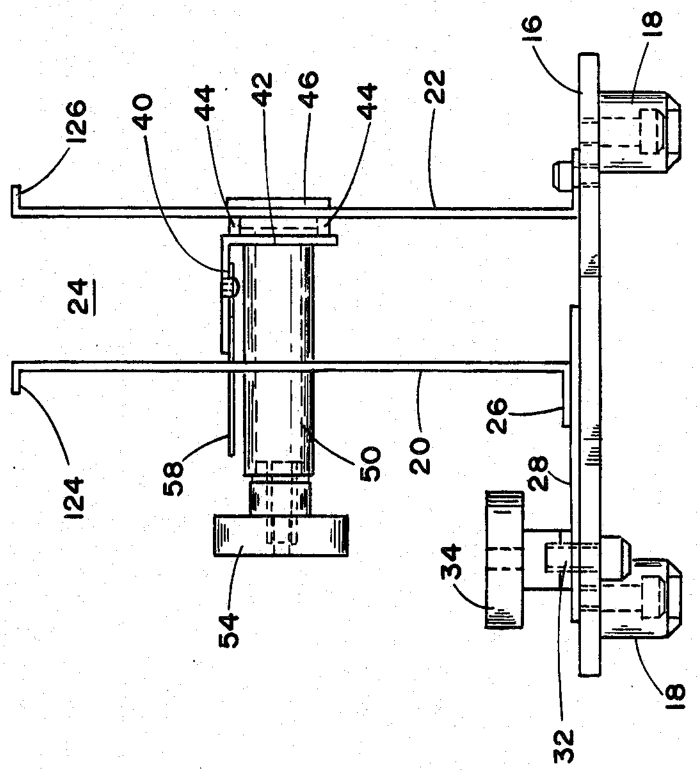
FIG. 3 is an end view of the carton guide channel and shows the carton height and width adjusting means.

Cigarette carton guide assembly 12 is shown in detail in FIGS. 2 and 3. As may be seen most clearly in FIG. 2, the guide assembly 12 has a generally planar, elongated rectangular base plate 16 which can be placed on any support surface such as a table or workbench (not shown) and which is supported by a plurality of downwardly depending resilient feet 18. A pair of upstanding spaced carton guide plates 20 and 22 are carried by base plate 16 and cooperate to form a carton guide channel or chute 24. Carton guide plate 20 is movable on base plate 16 with respect to fixed guide plate 22 so that the width of carton guide channel 24 is adjustable in accordance with various cigarette carton widths. It will be understood that the width of carton guide channel 24 should be adjusted to prevent the cartons fed therethrough from moving laterally but should not be so tight as to bind or restrict longitudinal movements of the cartons along the guide channel 24.

The lower portion of movable guide channel 20 terminates in an outwardly directed, generally horizontal flange 26. This flange 26 is secured at selected points along its length to the upper surfaces of spaced slide bars 28 which, as may be seen most clearly in FIG. 2, are each provided with elongated oval apertures 30 at a portion remote from each bar's attachment to flange 26. A threaded stud 32 passes upwardly through base plate 16 and through each one of these apertures 30 in slide bars 28. An adjustment knob 34 is carried on the upper end of each stud 32. When it is desired to change the width of carton guide channel 24, this can easily be accomplished by loosening adjustment knobs 34 thereby allowing movable carton guide plate 20 to be moved with slide bars 28 toward or away from fixed carton guide plate 22. Once the desired channel width for guide channel 24 has been attained, knobs 34 can be tightened down on studs 32 against the upper surfaces of slide plates or bars 32. If desired, the upper surfaces of the slide bars 28 can be suitably calibrated to facilitate rapid adjustment of channel width 24.

Again referring to FIGS. 2 and 3, the depth of carton guide channel 24 is also adjustable. A carton support plate 40 is slidably secured to fixed carton guide plate 22 for vertical movement with respect thereto. Carton support plate 40 includes a downwardly depending web 42 which carries a pair of spaced horizontal rods 44 that pass through an enlarged aperture in fixed carton guide plate 22. A backer plate 46 is attached to the free ends of horizontal rods 44 on the outer side of fixed carton guide plate 22, all as may be seen in FIG. 3. An elongated tightening member 50 extends through a generally vertical oval aperture 52 in movable carton guide plate and is operable by means of an adjustment knob 54 to exert a clamping force against fixed carton guide plate 22. If desired, the outer surface of movable carton guide plate 20 adjacent each aperture 52 may be calibrated, as shown at 56 and a suitable cursor 58 may be attached to carton support plate 40. The depth of carton guide channel 24 may be adjusted by raising or lowering carton support plate 40 so that the top of the carton will be properly spaced with respect to the stamp carriage assembly 12 whose intended position is shown in dashed lines in FIG. 2.

Carton guide assembly 12 also utilizes several additional elements. As cartons of cigarettes travel along carton guide channel 24 in the direction indicated by arrows A in FIGS. 1 and 2, they initially contact a carton flap opening plow 60 which is secured to stamp carriage assembly 14 and is positioned above carton guide channel 24. Such plows are generally well known and serve to open the flaps of a carton of cigarettes so that the lower ends of the individual cigarette packs will be exposed for stamping. Further downstream in the direction of carton travel, a carton stop and reset latch assembly, generally at 70, also attached to stamp carriage assembly 14, and is positioned adjacent the fixed carton guide plate 22. This assembly will be discussed in greater detail subsequently and functions to stop the carton during stamping and to release it after stamping has been completed. Once the carton has been stamped, it continues along carton guide channel 24, which it will be noted, offsets or breaks so that the stamped cartons are set over laterally in guide channel 24. The significance of this essential feature of the tax stamping machine in accordance with the present invention will also be discussed in greater detail subsequently.

After each carton of cigarettes has been stamped and set over, glue is applied to its still open flaps by a glue applicator 72 which is attached to fixed carton guide plate 22 and to base plate 16. Since glue applicator is generally conventional in structure and operation, it need not be discussed in further detail. Finally, the stamped cartons pass through a closing station where carton flap closers 74 and 76 attached to movable and fixed carton guide plates 20 and 22, respectively close the carton flaps. As with carton flap opening plow 60, and glue applicator 72, flap closers 74 and 76 are conventional in structure and operation.

Figure 4:
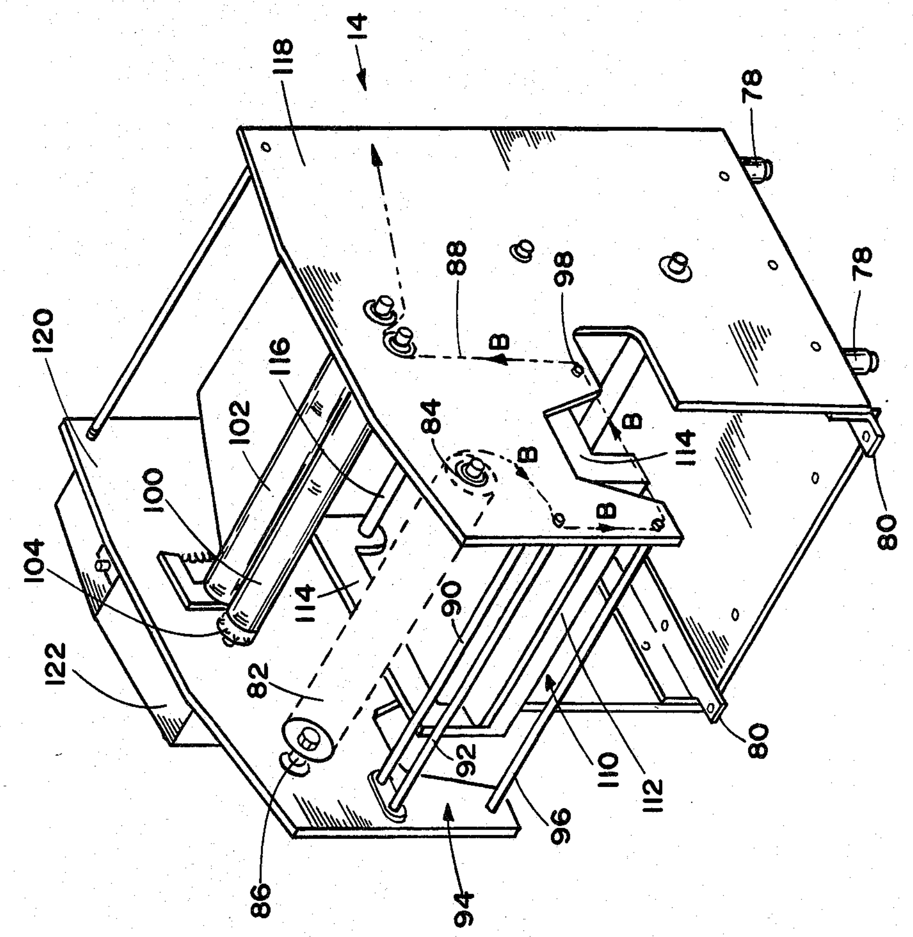
FIG. 4 is a perspective view of the stamp carriage portion of the tax stamping machine in accordance with the present invention.

Referrring now to FIG. 4, stamp carriage assembly, generally at 14, may be seen in greater detail. Since this stamp carriage assembly is generally similar in structure to the assembly set forth in detail in the previously referenced U.S. Pat. Nos. 4,184,305 and 4,263,766 its operating assemblies need not be discussed in great detail. Rather, the generally known portions of stamp carriage assembly 14 will be discussed more in functional rather than structural terms since the structure is detailed in the above-referenced patents. Stamp carriage assembly 14 is provided with suitable resilient support feet 78 and is securable to base plate 16 of carton guide assembly 12 generally at the midlength point of, and to the rear of fixed carton guide plate 22, as is shown schematically in FIG. 1. To facilitate this attachment, stamp carriage assembly 16 is provided with a pair of spaced, forwardly extending securement tabs 80 which are positionable beneath base plate 16 and through which securement bolts (not shown) may be passed.

Figure 6:
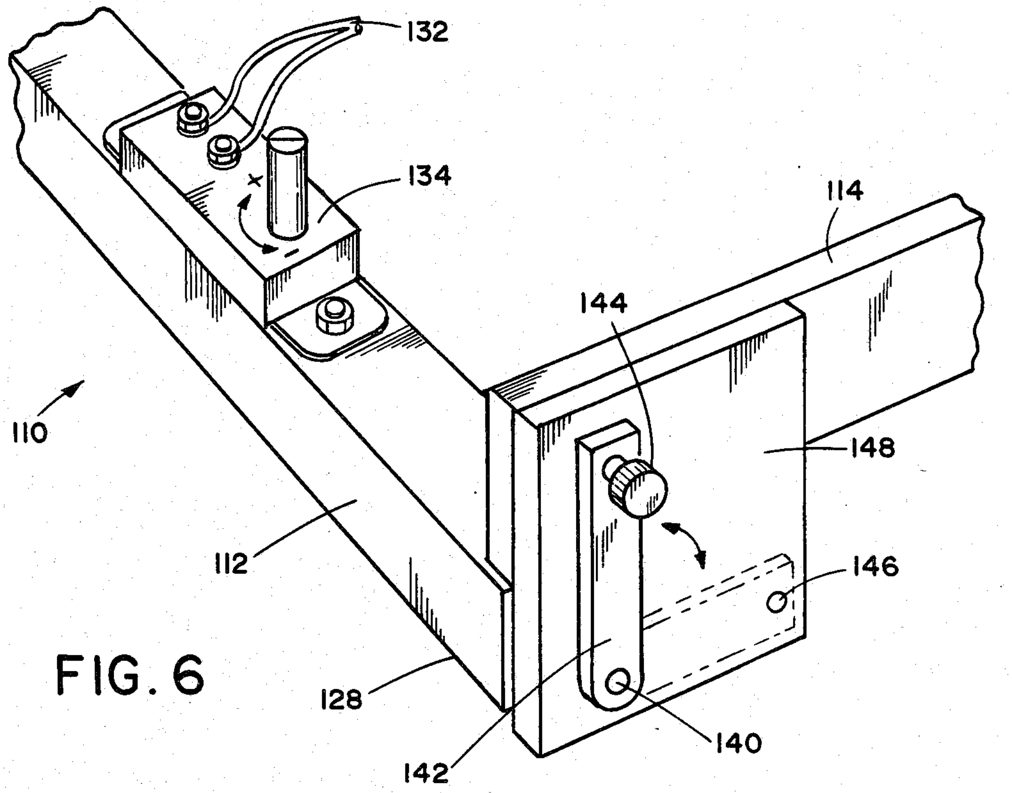
FIG. 6 is a perspective view of a portion of the stamp bar and showing the stamp pattern selector assembly.

An elongated sheet or web carrying suitable heat release tax transfers or decals is formed into a roll 82 which is shown in dashed lines in FIG. 4. This roll 82 of stamps is rotatably positioned in stamp carriage 14 between a pair of freely rotatable hubs 84 and 86. One or both of these hubs may be spring biased to allow easy removal and securement of roll 82. The web of stamps is threaded along a path shown in dashed lines at 88 in FIGS. 4 and 5 with the direction of web travel being indicated by arrows B. The path of travel of the web of stamps is under a first tension bar 90 and over a second tension bar 92 of an upper tension bar pair 94. The web then moves down and around a third tension bar 96 and rearwardly under and around a fourth tension bar 98. The web then is guided vertically upwardly around a drive roll 100 and between drive roll 100 and a spring biased pressure roll 102. As is conventional in the art, the stamp carrying web carries a plurality of spaced registration apertures along both edges with these apertures being engaged by spaced teeth or projections 104 at the ends of the drive roll 100. The purpose of these interengaging web apertures and teeth 104 is to insure that the stamp carrying web is positively positioned on the drive roll 100. As is also known in the art, the drive means for the stamp web drive roll 100 is typically provided with an electrically activated clutch (not shown) so that the drive roll 100 will be rotated a precise amount to advance the stamp carrying web a desired distance for each actuation of a heated stamp bar assembly, generally at 110 as seen in FIGS. 4, 5, and 6.

Referring intially to FIG. 4 heated stamp bar assembly 110 includes an elongated heated stamp bar 112 that is supported at its ends between forward portions of spaced stamp bar support arms 114. Rear portions of stamp bar support arms are carried by a stamp bar pivot rod 116 which extends between the spaced side plates 118, 120 of the stamp carriage assembly 14. The stamp bar support arms 114 are typically biased downwardly by suitable springs or the like (not shown) and are caused to move upwardly by a cam assembly which is driven in conjunction with the drive roller 100 by an electric motor and control assembly, generally shown at 122. As indicated previously, this is an assembly known in the art and set forth in detail in the previously referenced patents.

Figure 5:
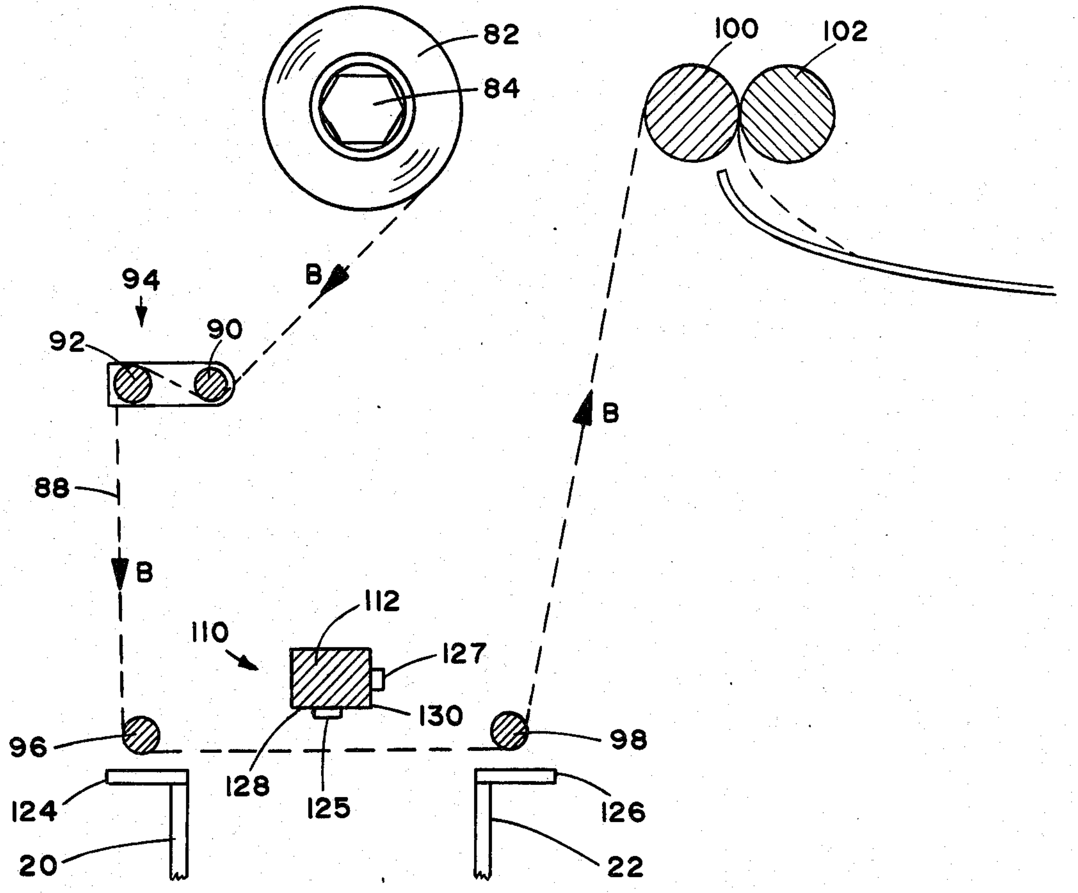
FIG. 5 is a schematic cross-sectional view of a portion of the stamp carriage assembly and showing the path of travel of the stamp web.

As may be seen in FIG. 5, stamp bar 112 is positioned above the path of web travel 88 between third and fourth tension bars 96 and 98, respectively with these bars generally overlying carton guide flanges 124, 126 placed at the tops of movable and fixed carton guide plates 20 and 22, respectively. Stamp bar 112 is provided with at least first and second sets 125 and 127 of heated platens located on two adjacent side surfaces 128 and 130, respectively, of generally rectangular stamp bar 112. A suitable electrical connection for stamp bar 112 is provided at 132, as seen in FIG. 6, and a heat control rheostat 134 is utilized to accurately control the temperature of the heated platens 124, 126 such that these platens will properly transfer the tax decals from the web traveling along web path 88 to the cigarette packs held in the cartons between the movable and fixed carton guide plates 20 and 22 as the stamp bar 112 moves downwardly.

Again referring to FIG. 6, stamp bar 112 is carried at its ends between stamp bar support arms 114 on stub shafts 140. Each stub shaft extends through, and is rotatable in an aperture in its corresponding support arm 114. One of the stub shafts 140 carries a heater bar position selector arm 142 at its outboard end. This selector arm 142 is provided with a spring biased or screw threaded latch pin 144 that is receivable in one of two apertures 146 in a stamp pattern selector plate 148 secured to stamp bar support arm 114. When latch pin 144 is released, selector arm 142 can be moved between either of the two selector apertures 146. This rotates stub shafts 140 and thereby causes heated stamp bar 112 to rotate 90°.

It will be understood that the sets of heated platens 125 and 127 carried on bar 112 will have a number and spacing selected to cooperate with the carton configuration being stamped. Futher, it will also be understood that the roll of stamps placed in the stamp carriage assembly will also have rows of stamps or decals having the same spacing. When the tax stamping machine is to be changed from one carton configuration to another, such as for example from a 1×9 to a 1×10 configuration, the 1×9 roll of decals is removed and the 1×10 roll is substituted. Selector arm 142 is moved by releasing latch pin 144 and moving arm 142 from, for example the 1×9 position to the 1×10 position. The heater bar 112 is thus rotated 90° to move the 10 platen array into place. While the stamp bar 112 has been described as being rectangular, it could have other cross-sectional shapes such as pentagonal or hexagonal or the like if other heated platen configurations and patterns are to be provided.

Figure 7A:
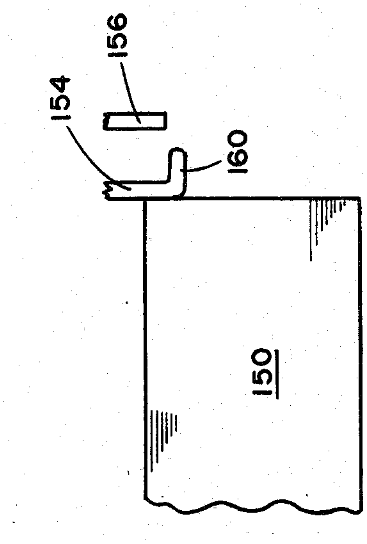
FIGS. 7A–7F are a schematic representation of the path taken by a carton of cigarettes during and after stamping.
Figure 7B:
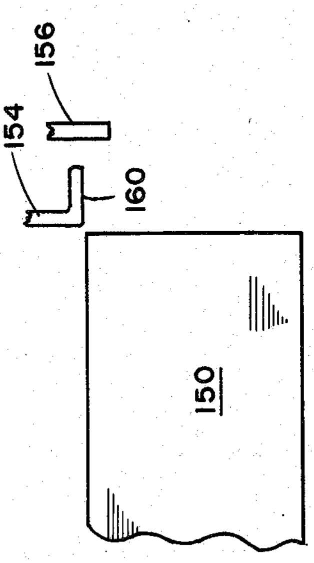
Figure 7C:
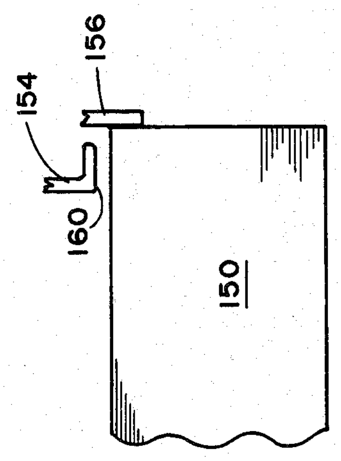
Figure 7D:
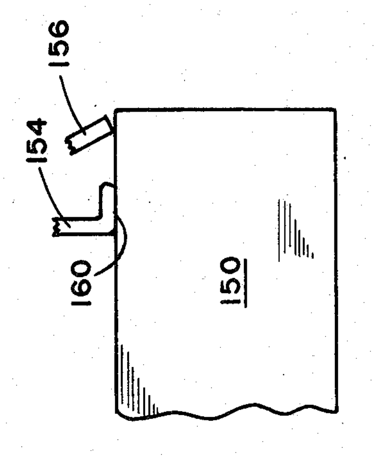

An operational sequence of the tax stamping machine in accordance with the present invention will be set forth with reference being directed primarily to FIGS. 7A–7F. Cartons of cigarettes are placed in guide channel 24 and are advanced in an end to end array past carton flap opening plow 60 until the leading edge of a first carton 150 contacts an electric control switch 152 positioned, as may be seen in FIG. 1, on carton support plate 40 generally adjacent stamp carriage assembly 14. Carton 150 is pushed forwardly until its leading edge is stopped by a carton stop bar 154 which is a part of carton stop and reset latch assembly 70. At this point, the carton is positioned within guide channel 24 so that the packs in the carton underlie the heated platens on stamp bar 112. A suitable roll of stamps has been placed between hubs 84 and 86 and has been fed through the stamp carriage assembly along path 88 and about drive roller 100 and between drive roller 100 and cooperating pressure roller 102. Stamp bar 112 has also been properly positioned so that the platen pattern and stamp pattern correspond. As carton 150 depresses switch 152 and engages carton stop bar 154, the heated stamp bar 112 is moved down to press the stamp web and decals against the bottoms of the cigarette packs for transfer of the decals to the packs. After a dwell time sufficient to affix the stamps or decals to the packs, the heater bar 112 is raised by the stamp carriage's drive motor which raises stamp bar support arms 114 around pivot rod 116. Concurrently, the stamp web is caused to advance by drive roll 100 through an electric clutch which drives the drive roll 100 a precise distance and then releases. As the heater bar 112 rises, the carton stop bar 154 is retracted by a suitable means such as a cam assembly (not shown) and is latched in a retracted position, as seen in FIG. 7B by a reset latch 156. This reset latch 156 is pivotable about a generally vertical axis 158 and operates to hold carton stop bar 154 in a retracted position. With carton stop bar 154 retracted, carton 150 can be pushed forwardly by the next carton. As it moves ahead, first carton 150 strikes reset latch 156, as seen in FIG. 7C and pivots it about vertical axis 158 so that reset latch 156 will release carton stop bar 154 which had been retracted back by drive motor 122 or other means, and which is spring loaded to extend into guide channel 24 when released. In the position shown in FIG. 7D, the carton stop bar 154 has moved back out toward guide channel 24 until its movement has been stopped by the side of carton 150. Carton stop bar 154 now slides along the side of first carton 150 as the first carton is pushed forward. A flat slide shoe 160 is formed to the forward end of carton stop bar 154 to prevent carton damage.

Figure 7E:
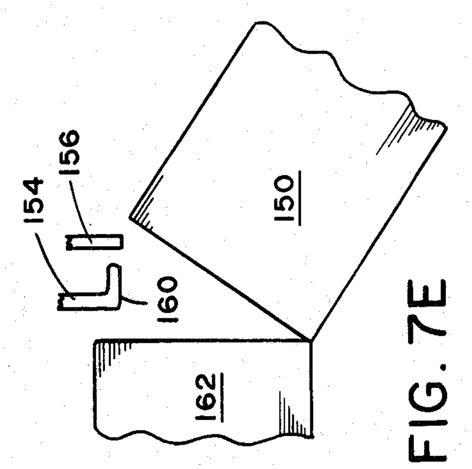
Figure 7F:
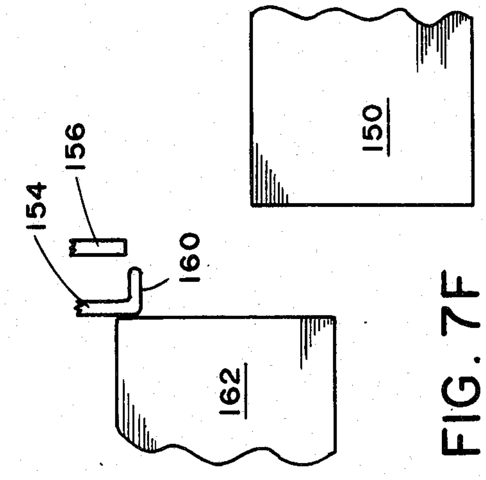

As was indicated previously, carton guide channel 24 offsets or breaks, as may be seen in FIGS. 1 and 2, at a point generally adjacent the carton stop and reset latch assembly 70. As first cigarette carton 150 is pushed forward by a second carton 162, it follows the guide path 24 so that the trailing edge of first carton 150 breaks or "fish tails". This forms a partial gap between the trailing edge of the first carton 150 and the leading edge of the second carton 112. When this gap or partial break occurs, the carton stop bar 154 moves into carton guide channel 24, as seen in FIG. 7E so that it will be positioned to engage and stop the second carton 162. As the second carton has been moved along the guide channel 24 by yet another carton, it has depressed switch 152 and has started the stamp carriage assembly through another cycle of its operation; i.e., movement of the heater bar 112 downwardly to transfer the decals from the advanced stamp web to the bottoms of the packs in the second carton. After this second carton's packs have been stamped and as the heater bar 112 rises, the carton stop bar 154 is again retracted and the stamp web drive roll 100 is again activated to advance the web to bring another set of stamps into proper orientation. As the second carton 162 is pushed along in the guide channel 24 by a third carton, the leading edge engages reset latch 156. It also pushes the first carton 150 further along guide channel 24 through the glue applicator 72 and the carton flap closers 74 and 76.

The tax stamping machine in accordance with the present invention has a capacity of up to 50 cartons a minute. Thus the above discussed sequence of operations actually is more in the nature of a continuous process rather than a step by step progression. While a feed rate of 50 cartons a minute is not as rapid as the completely automatic machines set forth in the previously referenced patents, it is very satisfactory for use with the non-standard carton configurations for which it is intended. The end to end hand feeding of the cartons eliminates costly and complex feed mechanisms while the offset structure of the carton guide channel allows the cartons being advanced along the channel to break or "fish tail" so that the carton stop bar 154 can be repositioned back in the guide channel 24 in an uncomplicated, reliable, effective manner. The rotatable heater bar 112 with its several different arrays of heated platens 124, 126 affords the tax stamping machine in accordance with the present invention the flexibility to be usable with multiple carton and pack configurations. By removing one roll of tax stamps or decals and inserting another roll with a different pattern of stamps and by placing the heater bar in the appropriate location, the tax stamping machine of the present invention can quickly be converted from, for example a 1×9 configuration to a 1×10 configuration or any other stamping array.

While a preferred embodiment of a tax stamping machine in accordance with the present invention has been fully and completely set forth hereinabove, it will be obvious to one of skill in the art that a number of changes in, for example the dimensions of the carton guide channel, the control means for the stamp carriage assembly, the platen patterns on the stamping bar, the glue applicator assembly, the carton flap opening and closing assemblies and the like could be made without departing from the true spirit and scope of the present inventon which is accordingly to be limited only by the appended claims.

What is claimed:

1. A tax stamping machine usable to apply decals to a surface of each one of plurality of packs of cigarettes contained in cartons of cigarettes, said tax stamping machine comprising:

a cigarette carton guide assembly having a carton guide channel, said guide channel having means to adjust the width and depth thereof;

a stamp carriage assembly positioned adjacent said carton guide channel and having means for advancing a decal carrying web above said cartons of cigarettes positioned in said guide channel;

a heated stamp bar for applying said decals to said packs, said stamp bar including means for selecting one of a plurality of patterns of decal transferring platens carried on said stamp bar;

means for stopping forward motion of said cartons in said guide channel during stamping of said packs by said stamp bar; and means for repositioning said carton stop means after each carton in a series of cartons has been stamped and advanced to allow passage of said stamped carton along said carton guide channel while stopping forward motion of a successive unstamped carton for stamping, said means for repositioning said carton stop including an offset section of said carton guide channel with said offset designed to create breaks between the cartons through which said stop means move during repositioning.

2. The tax stamping machine of claim 1 wherein said guide channel includes a fixed carton guide plate and a movable carton guide plate.

3. The tax stamping machine of claim 2 wherein said movable carton guide plate carries spaced slide bars at a lower portion.

4. The tax stamping machine of claim 3 wherein each of said slide bars is slidable on a base plate of said carton guide assembly.

5. The tax stamping machine of claim 4 wherein each of said slide bars includes an ovoid aperture through which passes an upright threaded stud attached to said base plate.

6. The tax stamping machine of claim 5 wherein an adjustment knob is carried by each said upright threaded stud and which clampingly engages said slide bar.

7. The tax stamping machine of claim 2 wherein said fixed guide channel carries a carton support plate.

8. The tax stamping machine of claim 7 wherein said carton support plate is movable vertically with respect to said fixed carton guide plate to vary the depth of said carton guide channel.

9. The tax stamping machine of claim 8 further including means to indicate the depth of said carton guide channel.

10. The tax stamping machine of claim 1 wherein said heated stamp bar has a plurality of sides.

11. The tax stamping machine of claim 10 wherein at least two of said sides of said heated stamp bar each carry one of said plurality of patterns of decal transferring platens.

12. The tax stamping machine of claim 11 wherein said heated stamp bar is rotatably supported between spaced stamp bar support arms in said stamp carriage assembly.

13. The tax stamping machine of claim 12 wherein a platen pattern selector arm is secured to one end of said rotatable heated stamp bar.

14. The tax stamping machine of claim 13 wherein said selector arm is positionable in selected positions in a pattern selector plate to position a selected pattern of platens in cooperation with a corresponding stamp pattern on said decal carrying web.

15. The tax stamping machine of claim 1 wherein said means for stopping forward motion of said cartons includes a carton stop and reset latch assembly.

16. The tax stamping machine of claim 15 wherein said carton stop and reset latch assembly includes a carton stop bar which is extendable transversely into said carton guide channel.

17. The tax stamping machine of claim 16 wherein said carton stop bar includes a carton engaging slide shoe.

18. The tax stamping machine of claim 15 wherein said means for repositioning said carton stop and reset latch assembly includes an offset section of said carton guide channel.

19. The tax stamping machine of claim 18 wherein said guide channel offset section forms a partial gap between cartons advancing along said guide channel, said partial gap being positioned adjacent said carton stop and reset latch assembly.

20. The tax stamping machine of claim 19 wherein a carton stop bar portion of said carton stop and latch assembly projects into said partial gap to stop a second carton in said guide channel after a first carton in said guide channel has been advanced past said stamp carriage.

* * * * *